March 14, 1939.  A. J. HOLMAN  2,150,165
MOTION PICTURE APPARATUS FOR PROJECTING COMPOSITE SCREEN IMAGES
Filed Jan. 28, 1935  2 Sheets-Sheet 2
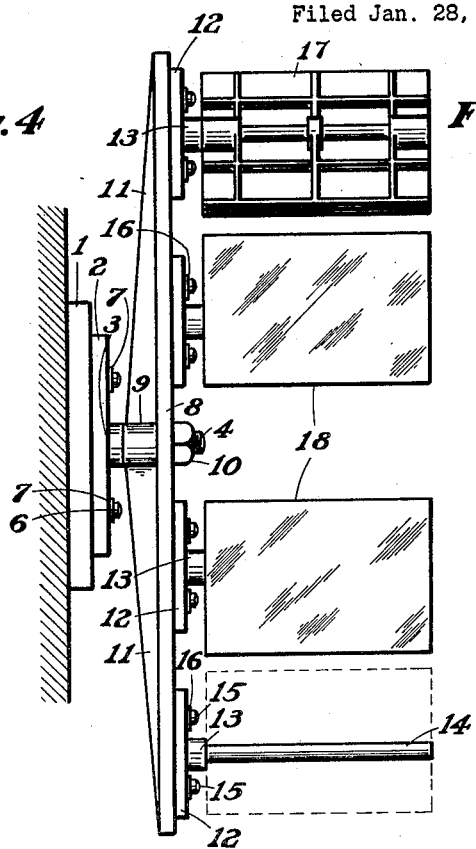
Fig. 4
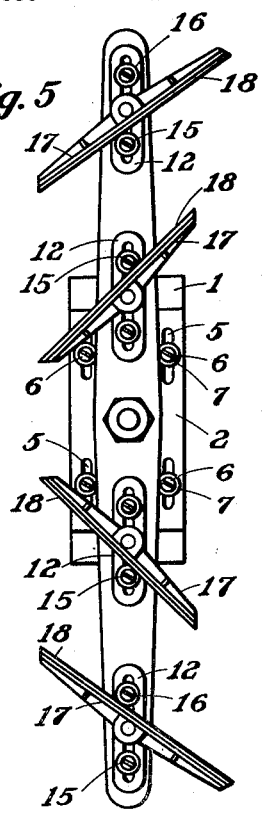
Fig. 5
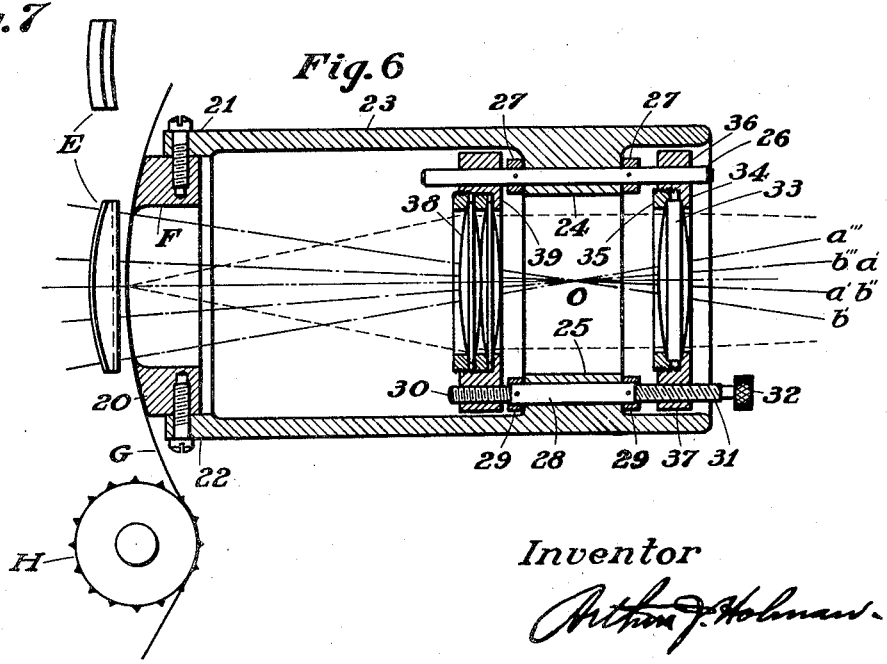
Fig. 6
Fig. 7
Inventor
Arthur J. Holman

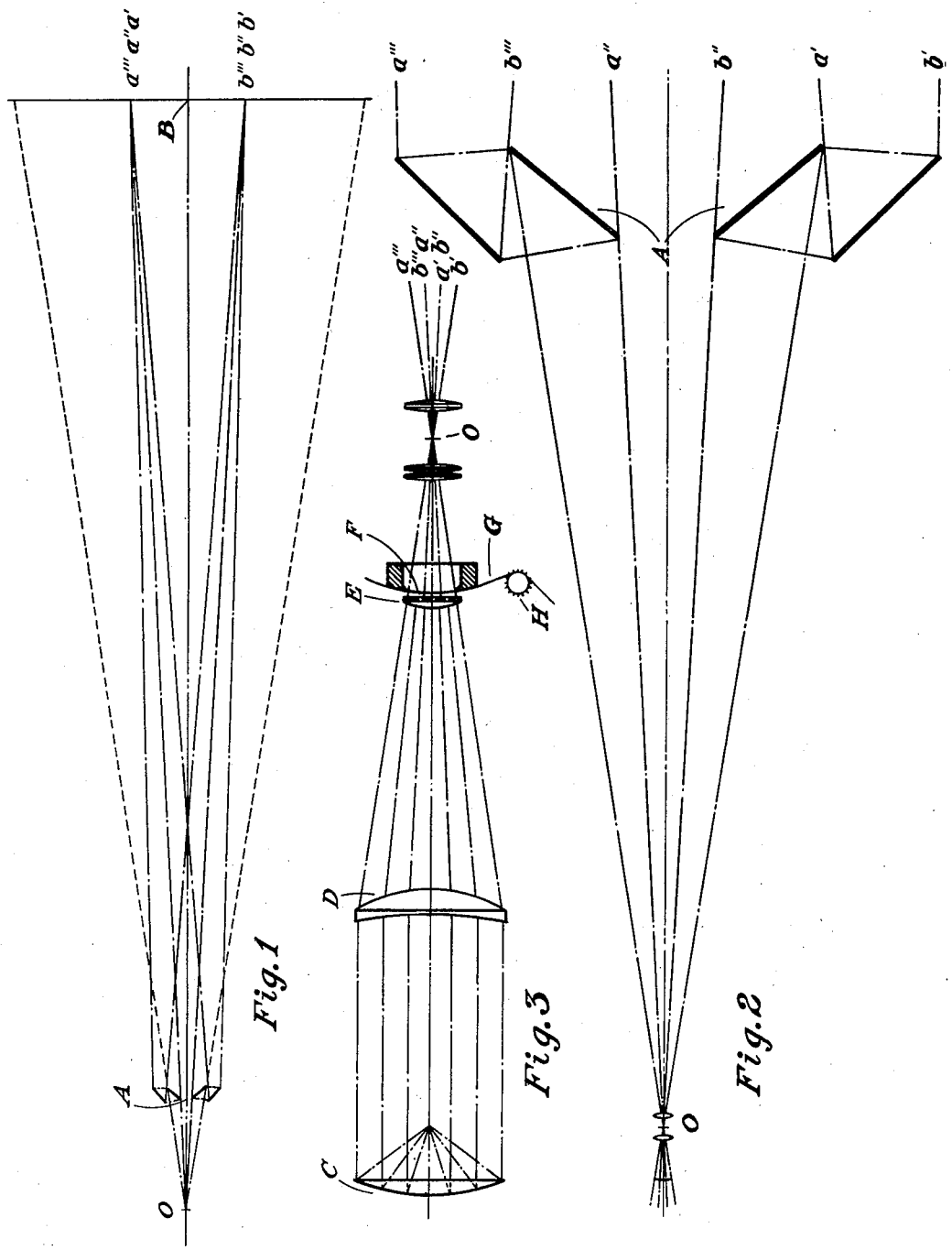

Patented Mar. 14, 1939

2,150,165

UNITED STATES PATENT OFFICE

2,150,165

MOTION PICTURE APPARATUS FOR PROJECTING COMPOSITE SCREEN IMAGES

Arthur J. Holman, East Orange, N. J.

Application January 28, 1935, Serial No. 3,786

3 Claims. (Cl. 88—16.6)

My invention relates to apparatus for exhibiting on a screen composite images, including all picture elements and color values contained in two or more motion picture film frames, each of the size standard to the particular width film strip being used. The system of projection peculiar to this invention involves the combination of an optical economizer, such as is described in Letters Patent of the United States Number 1,989,094 dated January 29, 1935, with a suitable condenser system and an objective adapted and arranged to provide a screen image of exact size, regardless of the amount of shrinkage in the particular reel of film being exhibited. The special object of this invention is to provide practical means for the projection of motion pictures in natural colors using a film whereon the primary color values are carried separately on either two or three adjacent film frames, each of said frames being of the size standard to the paticular film width. My optical system is also suitable for the projection of images in black and white, and, when so used, it provides increased screen illumination with decreased spot intensity at the aperture plate and smoother action combined with a minimum of stroboscopic effects.

Various devices have been patented from time to time which were intended to solve the problem of projecting multiple images of adjacent film frames in register on a screen. Notable among these are the devices described by Pfenninger in British Patent Number 15,726 of July 9, 1907, and by Bjerregaard in United States Letters Patent Number 1,130,702 dated March 9, 1915. None of the devices of this nature which were patented heretofore have come into commercial use for the simple reason that the inventors invariably worked with close-coupled deviators mounted either between elements of the objective lens or in close proximity thereto. Elementary optical diagrams, showing only light rays which pass through the equivalent center of the objective, are deceiving in that they tend to indicate that close-coupled deviators might be effective for the purpose but a little consideration of the fact that all areas of an objective lens collect and transmit to the screen some light from all areas of the film strip overlying the aperture proves conclusively that such deviators are inoperative. Furthermore, former patented optical systems for projecting in register multiple images on a screen have had condensers inadequate for the purpose and have not provided for adjustment of the objectives to compensate for variation in film shrinkage from reel to reel.

An optical economizer must be positioned at a sufficient distance forward of the objective to permit the bundles of rays originating in each film frame at the aperture to become segregated and disentangled from the rays originating in the other frames overlying the aperture. I have found it advisable, and have for years followed the practice of locating the optical economizer forward of the objective a distance equal to some value lying between the square root and the cube root of the projection distance. For short throws the economizer position will be spaced from the projector an amount approximating the square root of the projection distance and for extremely long throws the separation will be more nearly equal to the cube root of the projection distance. This amount of spacing between projector and economizer is not only essential to prevent falling off of light intensity toward top and bottom edges of the screen, but it is also advantageous in that the magnification ratio from economizer mirrors to screen is greatly reduced. This latter factor is of great importance because slight imperfections in the mirrors will not distort or mar the image perceptibly. Moreover, it is not in the least difficult to maintain the reflecting surfaces in good condition for long periods because the intensity of the reflected light is relatively very low.

The present application discloses a practical system for multiple image projection from a single film strip. Its purpose is to secure patent protection for more extensive use of the optical economizer than is provided under the claims in the above mentioned patent.

My device and its application and uses may be best understood by reference to the drawings in which—

Fig. 1 is a diagram to scale, illustrating the relative positions of equivalent center of objective at O, optical economizer at A and screen at B, when the optical economizer is located a distance forward of the objective equal to the square root of the distance OB, i. e.

$$OA = \sqrt{OB}$$

Fig. 2 is a diagram to a considerably larger scale illustrating the position and size of objective with respect to the optical economizer.

Fig. 3 is a schematic view also to scale illustrating the optical system from the light source through the objective, showing the reflector at C, condenser at D, gate lens at E, aperture at F, equivalent center of objective at O, film strip at G and film feed sprocket at H.

Fig. 4 is a view, looking toward the screen, showing the rear of an optical economizer.

Fig. 5 is a side view of the device shown in Fig. 4.

Fig. 6 is a cross-sectional view on the vertical plane through the optical axis showing the aperture unit and objective mount and means for adjusting the elements of the objective with respect to the film overlying the aperture. This figure shows also the path through the objective of light rays originating in the film at the optical axis and passing not through the equivalent center O but through the marginal region of the objective.

Fig. 7 is a top view of gate lens E.

Referring now more specifically to the drawings, in which like reference numerals indicate like parts, 1 is a metallic plate, which is suitably attached to a vertical support forward of the projector position. (Figs. 4 and 5.) An adjustable plate 2, having integral boss 3 into which is fixed a stud 4, is provided with slots 5 through which pass the screws 6 which enter plate 1, thereby holding adjustable plate 2 in position. Suitable washers 7 are provided under heads of screws 6. A bracket 8, having integral boss 9 bored to fit on stud 4 is pivoted on stud 4 and is locked in any desired position by nut 10. The bracket 8 is provided with stiffening web 11 and is finished on one surface to seat four adjustable plates 12, each of which is provided with integral boss 13, into which is fixed a stud 14. The adjustable plates 12 are slotted to receive screws 15, which are provided with suitable washers 16, and enter the bracket 8, thus securing the adjustable plates to the bracket. Pivoted on each stud 14 is a large webbed plate 17 to which is cemented or otherwise suitably attached a reflector 18. The plates 17 may be fixed in any desired angular position on the studs 14 by suitable set screws. The reflectors 18 must have reasonably good optical surfaces and if they are made of glass, the surfaces of the glass must be parallel and the second surface should be silvered.

Each reflector 18 has a flat reflecting surface when used in my optical economizer in conjunction with a projector of the optical rectifying type as specified in the above mentioned patent. I have found, however, that with stationary objective elements, better registration of images at the screen may be obtained if the reflectors are made with cylindrical reflecting surfaces. By this means it is possible and practical to eliminate some of the effects of distortion which are introduced by using a curved aperture plate in conjunction with fixed objective elements. Very little curvature is required in the cylindrical reflectors, because the distortion of the upper and lower film frame images, which takes the form of a slight lengthening in the vertical direction, is quite small and of no particular significance except in areas adjacent the top and bottom edges of the screen. Whenever the equivalent focal length of the objective system is reasonably long and the rear component is not close to the aperture, the image distortion will not require correcting, hence plane reflectors will produce satisfactory composite screen images.

The method for setting and adjusting an optical economizer with respect to a projector and screen is described fully in the optical economizer patent above referred to. The economizer is placed as far forward of the projector as its size and convenience in mounting will permit. In the set-up illustrated in Figs. 1, 2 and 3, the economizer is positioned at "A", the distance OA being equal to the square root of the projection distance OB. Fig. 2 illustrates the relative size of the objective and the economizer mirrors. The clear opening through the economizer must be equal in height to several times the diameter of the objective, otherwise there will be imperfect selection of images by the economizer.

An objective suitable for use with the optical economizer must comprise means for adjusting the front and rear elements, each with respect to the other, and also with respect to the aperture plate. In Fig. 6, is illustrated such as objective. Aperture block 20, containing aperture F, has fitted to its upper and lower surfaces, the projecting portions 21 and 22 respectively integral with objective mount 23 and screws passing through these projecting portions secure the objective mount to the aperture block. Within the objective mount are integral bosses 24 and 25. Within the bore in boss 24 is supported a rod 26, which projects from the boss in both directions and is retained in correct position by collars 27, which are pinned to the rod. Within a bore in boss 25 is rotatably mounted a member 28 which is retained in position by collars 29 pinned to member 28 so as to prevent end play thereof. Projecting rearwardly from boss 25 is a portion 30 of member 28, which is threaded with a fine pitch single thread. Another portion 31 of member 28 projecting forwardly from boss 25, is provided with a multiple thread of such pitch as to provide a definite ratio to the lead of thread 30 for the purpose hereinafter specified. A knurled adjusting head 32 is press-fitted on the forward end of member 28 and serves to rotate the same.

The front component 33 of the objective is mounted in a cell 34 and is retained therein by cell nut 35. An integral boss 36 on cell 34 contains a bore, wherein the rod 26 may slide. The integral boss 37 on cell 34 is tapped to fit the multiple thread 31 on the relative positions of rod 26, member 28, and bosses 36 and 37 are such that turning of the knurled adjusting head 32 will move the front component 33 along its optical axis.

The rear component 38, which may consist of one or more separate lenses, is retained in a cell 39 by a suitable cell nut and spacers, and the cell 39 is provided with integral bosses, positioned and machined to fit over rod 26 and on thread 30, so that rear component 38 will be centered on the optical axis of front component 33, and may be moved along said axis by rotating the knurled adjusting head 32.

It will be apparent from Figs. 1, 2 and 3, that the geometrical relations existing between the screen, optical economizer, objective and film frames at the aperture will be disturbed if any one of these elements is displaced or changed in size. It follows, therefore, that if we set the economizer reflectors for any given reel of film, the setting will have to be changed when another reel, having a different shrinkage factor, is projected, otherwise the projected images will not register. It would be difficult to re-adjust the economizer quickly and with sufficient accuracy, hence I have provided an adjustable objective which enables the projectionist to compensate for any amount of shrinkage.

My objective is designed to have a relatively long back focus and the front and rear components are spaced rather less than is customary in projection objective design. The general nature of the optical design is disclosed in Letters Patent of the United States No. 1,913,389 dated June 13, 1933. The principles involved in adjusting the components with respect to each other and to the film at the aperture for the purpose of compensating for film shrinkage is disclosed in Letters Patent of the United States No. 1,857,152 dated May 10, 1932.

The objective components 33 and 38 are moved axially by turning knurled adjusting head 32. The leads of screws 30 and 31 effect such displacements of the lens components as to keep the screen image sharply focused at all times during the adjustment, but the magnification ratio is varied, the larger ratio being obtained when the components 33 and 38 are closest together and nearest to the aperture plate. The setting just described obtains when film having the maximum shrinkage is being exhibited. The need for adjustment of the objective becomes apparent to the projectionist when he observes a lack of registration in the composite screen image, and this he can rectify quickly by simply manipulating knurled adjusting head 32.

In Fig. 6 is shown diagrammatically the arrangement of the ray bundles which pass through the three separate film frames overlying the aperture and through the equivalent center O, of the objective. Tracing backward, it will be seen that the bundle bounded by lines $a'b'$ comes from the film frame which occupies the upper third of the aperture. Similarly, the bundle bounded by lines $a''b''$ contains the rays from the film frame which is centered on the optical axis, and the bundle bounded by lines $a'''b'''$ comprises the rays from the film frame occupying the lower third of the aperture. The passage of the three ray bundles through the optical economizer may be traced in Fig. 2 and their ultimate destination at the screen plane B, is shown in Fig. 1. It is to be noted, however, that these three ray bundles do not include all the light transmitted by the objective which originates in the film frames at the aperture. Light from the condenser system illuminates the film at the aperture and some of this light is transmitted directly to the objective as the condenser beam. But some condenser light is dispersed at the film, hence each elemental film area at the aperture becomes a secondary light source from which light is transmitted by all areas of the objective. In Fig. 6 is shown, by dash lines, the boundary of the bundle of secondary rays transmitted by the objective from an elemental film area located at the optical axis. It is the summation of these secondary ray bundles which makes it necessary to locate the optical economizer a substantial distance forward of the objective. The economizer cannot be positioned in a plane closer to the projector than that in which the secondary ray bundles from each film frame have come substantially within the boundary of the direct ray bundles as indicated by the lines $a'b'$, $a''b''$, and $a'''b'''$. It is obvious from the foregoing that it would be impossible for any deviating means to select and separate the ray bundles belonging to each frame image at any plane within the objective or in close proximity thereto. The clear diameter of the objective is one of the major factors in determining the correct position for the optical economizer.

The composite color image on the screen will be unsatisfactory unless the three film frames at the aperture are illuminated uniformly. Moreover, the light from the condenser system must be of such cross-section at the aperture that the spot efficiency will be at least as high as in a one frame projection system, and the light must be so directed through the film that it will enter the objective. These conditions cannot be met except by the use of a special condenser system designed for the purpose. Fig. 3 is a schematic view of a suitable light gathering system, showing a parabolic reflector at C which picks up light from its focus point on the optical axis and directs it in substantially parallel beams to the sphero-cylindrical condenser D. The condenser D has a concave cylindrical surface facing the reflector, the axis of the cylinder being at right angles to the plane of the paper and intersecting the optical axis of the system at right angles. The second surface of condenser D is spherical. The effect of the concave cylindrical surface is to reduce the refracting power of the condenser in the plane illustrated by the drawing, hence the spot at the plane of gate lens E will be elliptical in form, the major axis of the ellipse being parallel to direction of film movement. The relative strength of cylinder and sphere is such as to cause maximum spot efficiency, i. e., greatest ratio of aperture area to spot area.

If this beam from the condenser D were not modified before passing through the film, it would illuminate the film brightly and uniformly, but it would not enter the objective, and much of the light which entered the rear component would not emerge from the front component. The beam is highly astigmatic in the vertical plane through the optical axis, and hence must be modified, prior to passing through the film strip, in such a manner, that its cross section at the plane of the equivalent center O, of the objective will be substantially circular. This result is obtained by the use of gate lens E, the first surface of which is spherical and the second surface (adjacent the film position) is cylindrical. The cylindrical surface is concave but its axis is in the plane of the paper, hence the gate lens has the full refracting power of its spherical surface in the vertical plane (plane of the paper) and a reduced refracting power in the horizontal plane. It will be obvious to those skilled in the art of projection optics that the condenser D and gate lens E are complimentary, hence the most satisfactory aperture illumination combined with the highest percentage objective transmission will be obtained by a proper balance of spherical and cylindrical refracting powers plus the proper relative spacing of light source, condenser, gate lens and objective. With this system, I have obtained most satisfactory results when the back focus of the objective is relatively long as hereinabove stated.

The condenser system, objective and optical economizer herein described fulfill the requirements for projecting a composite image of three adjacent frames on one film strip. The system is practical for three-color additive projection in natural color, and for projection in black and white where more screen illumination is required than can be provided safely through a single frame projector. This system is simple, easily adjusted to correct for variable shrinkage in film, and it provides maximum brightness and uniformity of image.

Having thus fully described my invention, what I claim is:

1. An optical system for projecting a composite screen image from full frame pictures arranged in standard fashion on a single film strip, comprising a sphero-cylindrical condenser adapted and arranged to illuminate efficiently a three frame aperture, a sphero-cylindrical gate lens adapted and arranged to neutralize the astigmatism of said condenser at or near the nodal point of the objective, a curved aperture plate having an aperture three frames high, an objective with components adjustable to compensate for film shrinkage and an optical economizer, all arranged substantially as specified and as illustrated.

2. In apparatus for projecting a composite screen image, the combination of a light source, an astigmatic converging system adapted and arranged to produce an elongated spot, a second astigmatic element positioned adjacent the film strip and adapted and arranged to neutralize the effect of said astigmatic converging system at or near the nodal point of the objective, a curved aperture plate having a three frame aperture, and an objective comprising at least two positive elements and adjustable means adapted and arranged to so vary the spacing of said elements each with respect to the other and both with respect to the film strip overlying the aperture, as to maintain the projected image constant in size and in definition whatever the shrinkage factor of the particular film strip being projected.

3. Apparatus for projecting a composite screen image comprising a light source, a collector system including an astigmatic element adapted and arranged to produce an elongated spot, a second astigmatic element positioned adjacent the film strip and adapted and arranged to neutralize the effect of said first astigmatic element at or near the nodal point of the objective, a curved aperture plate having a three frame aperture, an objective comprising two or more positive elements and adjustable means adapted and arranged to so vary the spacing of said elements each with respect to the other and both with respect to the film position on the aperture plate as to maintain the projected image constant in size and in definition whatever the shrinkage factor of the particular film strip being projected, and an optical economizer positioned and arranged to pass to the screen all ray bundles comprising the central frame image and to select and deflect all ray bundles comprising the upper and lower frame images in such manner as to register the same on the screen each with the other and both with the central frame image.

ARTHUR J. HOLMAN.